No. 730,195. PATENTED JUNE 2, 1903.
J. & L. STOVEKEN.
METALLURGICAL FILTER.
APPLICATION FILED OCT. 31, 1902.
NO MODEL. 3 SHEETS—SHEET 1.
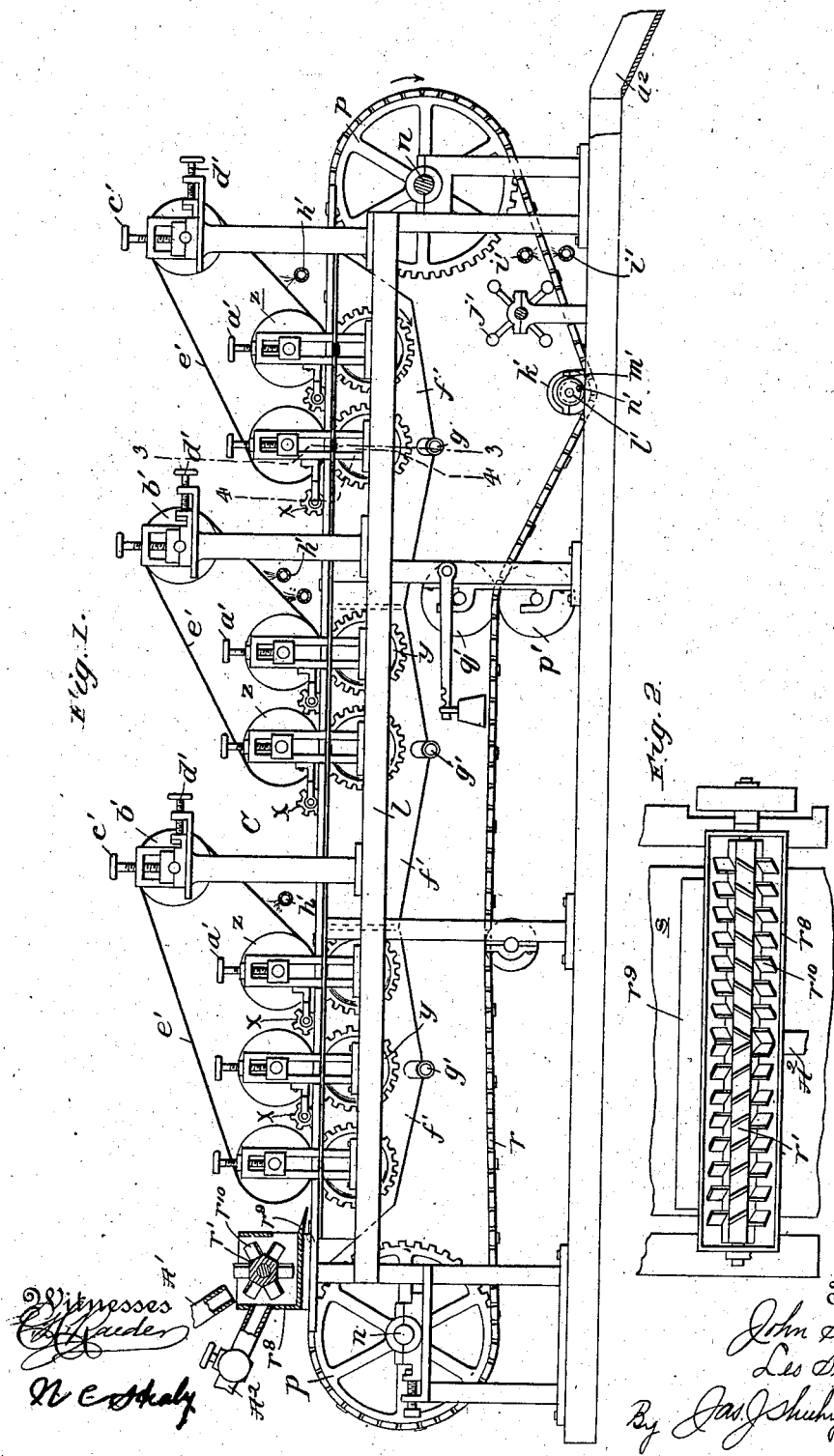

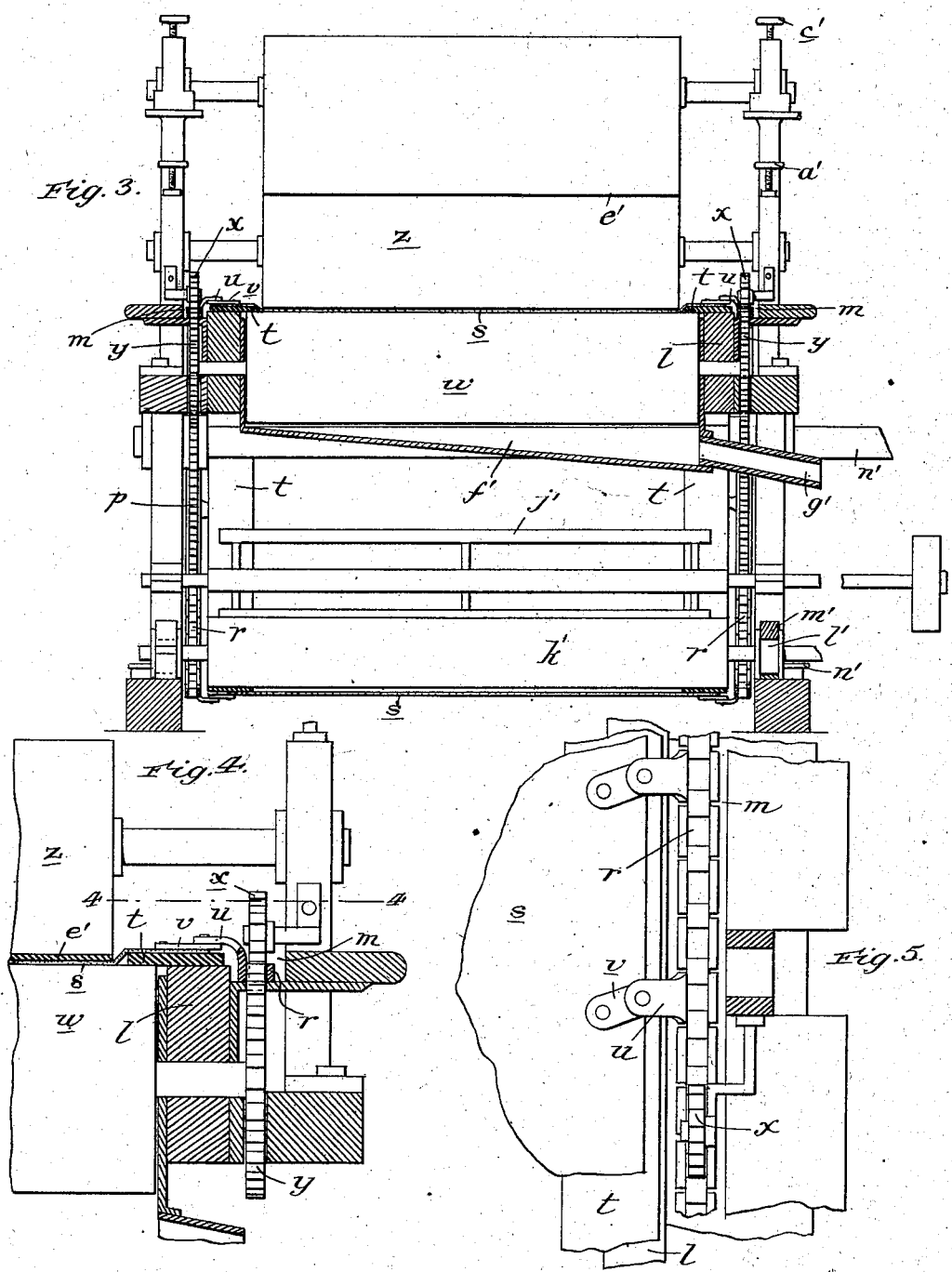

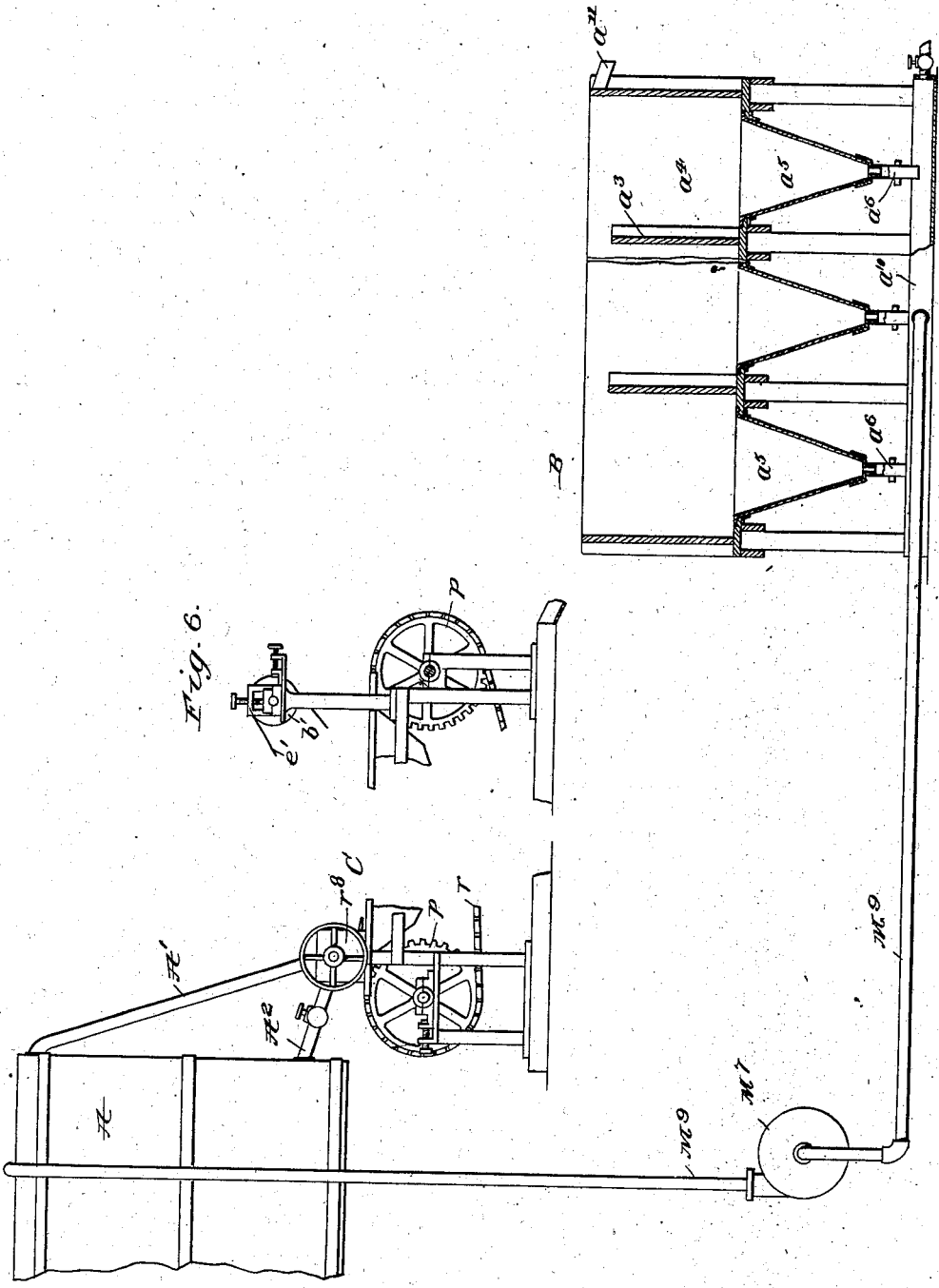

No. 730,195. Patented June 2, 1903.

UNITED STATES PATENT OFFICE.

JOHN STOVEKEN, OF CRIPPLECREEK, AND LEO STOVEKEN, OF FLORENCE, COLORADO.

METALLURGICAL FILTER.

SPECIFICATION forming part of Letters Patent No. 730,195, dated June 2, 1903.

Original application filed August 12, 1902, Serial No. 119,433. Divided and this application filed October 31, 1902. Serial No. 129,618. (No model.)

*To all whom it may concern:*

Be it known that we, JOHN STOVEKEN, residing at Cripplecreek, in the county of Teller, and LEO STOVEKEN, residing at Florence, in the county of Fremont, State of Colorado, citizens of the United States, have invented new and useful Improvements in Filters, of which the following is a specification.

Our invention relates to improvements in filters for use in apparatus for extracting precious metals from their ores; and it has for its object to provide an efficient and reliable filter designed more particularly for employment in the apparatus forming the subject-matter of our contemporary application filed August 12, 1902, Serial No. 119,433, which apparatus is designed more especially for the treatment of ores in which only a small percentage of values can be saved by amalgamation and which ores are of too low grade to be treated by barrel chlorination and too clayey or slimy to be percolated by cyanid solution.

The present application is filed as a division of our contemporary application above mentioned.

With the foregoing in mind the invention will be fully understood from the following description and claims when taken in connection with the accompanying drawings, in which—

Figure 1 is a side elevation, partly in section, of our improved filter. Fig. 2 is a detail plan view of the spreader forming part of the filter. Figs. 3 and 4 are enlarged sections taken in the planes indicated by the broken lines 3 3 and 4 4, respectively, of Fig. 1. Fig. 5 is a detail horizontal section taken in the plane of the broken line 4 4 of Fig. 4, looking downwardly; and Fig. 6 is a broken view, partly in elevation and partly in vertical section, illustrating the improved filter in connection with the lowest agitation-tank and the decanting-vat of the apparatus disclosed in our prior application *supra*.

Similar letters of reference designate corresponding parts in all of the several views of the drawings, referring to which—

A, Fig. 6, is an agitation-tank. This tank is the last and lowest of the series disclosed in our aforesaid prior application and is provided with a discharge-pipe A', which leads from its upper portion and is designed to conduct pulp or mixed comminuted ore and solution to the filter presently described. When desired, the tank A may also be provided with a valved pipe A², which leads from its lower portion and is designed to be used when the tank is to be cleaned out.

B is a decanting-vat, which is similar to that shown in our aforesaid prior application—*i. e.*, is divided by transverse partition-walls $a^3$ into a plurality of decanting-tanks $a^4$. Each of these tanks is provided at its lower end with a steep funnel $a^5$, which is provided in turn at its lower end with a valved discharge $a^6$, arranged over a trough or receptacle $a^{10}$. Said tanks are designed to receive solutions from the receptacles of the filter, presently described, and when the solutions are led into them through conduits (not shown) the slimes settle into the funnels $a^5$ and are drawn off at intervals into the receptacle $a^{10}$, while the clear solution passes through one or more conduits $a^{11}$ at one end of the vat to a gold-tank. (Not shown.)

C is our improved filter, which is preferably arranged between the tank A and the vat B, as shown. The said filter is best shown in Figs. 1 to 5, referring to which $l$ is the main frame of the filter, which preferably comprises a base and two longitudinal uprights and is provided at the upper sides of the latter with parallel longitudinal ways $m$, Figs. 2 to 4; $n\ n$, transverse shafts journaled in the uprights of the frame at the ends thereof and equipped with sprocket-wheels $p$, arranged in alinement with the ways $m$; $r\ r$, sprocket-chains mounted on the wheels $p$ and having their upper stretches disposed in the ways $m$; $s$, an endless filter-cloth; $t\ t$, endless strips of rubber or other suitable material, secured to the inner side of the cloth $s$ at the edges thereof and having for their purpose to bear on the upper edges of the longitudinal frame-uprights, and thereby prevent frictional wear of the cloth; $u\ u$, arms connected to the chains $r$ at intervals in the length thereof and extending inwardly therefrom; *v v*, links which connect the filter-cloth and rubber belts to the arms *u*; *w w*, transverse rolls of wood or other suitable material mounted in the frame-uprights below the upper stretch of the filter-cloth and arranged by preference in three sets, as best shown in Fig. 1; *x x*, idler sprocket-wheels disposed above and in engagement with the upper stretches of the chains *r* and having for their purpose to hold the chains down on sprocket-gears *y* on the rolls *w*, so as to assure the rotation of the rolls in the direction indicated by arrow by the chains; *z z*, transverse rolls arranged in three sets above the rolls *w* and the upper stretch of the filter-cloth *s* and designed to be pressed by screws *a'* or other means toward the filter-cloth; *b' b'*, rolls, one of which is employed in conjunction with each set of rolls *z*; *c' c'*, screws, the purpose of which is to hold the upper bearing-blocks of the rolls *b'* on the lower slidable bearing-blocks thereof; *d' d'*, screws for adjusting the bearings of the rolls *b'* in the direction of the length of the filter and adjustably fixing the same in position; *e' e'*, belts, of rubber or other suitable material, passed around the rolls *z* and *b'* and having their lower stretches arranged in frictional contact with the filter-cloth *s*; *f' f'*, receptacles arranged under the three sets of rolls *w* and designed to be connected by pipes *g'* with the separate decanting-tanks $a^4$ of the vat B; *h' h'*, pipes designed to be connected with a source of water-supply and arranged to spray water against the stretches of the rubber belts *e'* between the filter-cloth *s* and the rolls *b'*; *i' i'*, pipes arranged to spray water against the lower stretch of the filter-cloth *s*; *j'*, a rotary beater arranged adjacent to the pipes *i'* and adapted to engage the lower stretch of the cloth *s*; *k'*, a transverse roller arranged above the lower stretch of the cloth *s* and adjacent to the beater and having its ends journaled in disks *l'* off the center thereof, the disks being arranged in straps *m* and provided with handles *n'*; *p'*, a transverse roll arranged below the lower stretch of the cloth *s*; *q'*, a weighted transverse roll arranged above the lower stretch of the cloth *s* and having for its purpose to squeeze the same against the roll *p'*, and *r'* a rotatable spreader arranged above the upper stretch of the cloth *s* at the receiving end of the filter. One of the shafts *n* of the filter is designed to be driven by a suitable motor, (not shown,) while the beater *j'* is preferably driven from an overhead counter-shaft. (Also not shown.) The spreader *r'* is arranged in a box $r^8$, which preferably has an apron $r^9$, overhanging the belt *s*. The spreader is a six-sided shaft having wooden flights or wings $r^{10}$ on its sides, the wings at one side of the center of the shaft being inclined oppositely to those at the opposite side of the center. The spreader is driven by a belt from an overhead counter-shaft. (Not shown.)

The operation of the filter C in detail is as follows: The chains *r* and filter-cloth *s* are driven in the direction indicated by arrow and the beater *j'* and spreader *r* are rotated. The rubber belts *e'* are driven in the direction indicated by arrow by the friction between them and the filter-cloth. The pulp and solution are discharged from the last agitation-tank A through pipe A' into the spreader, which has flights extending right and left from the center, and is consequently adapted to keep the pulp and solution mixed and spread the same uniformly across the filter-cloth. The filter-cloth carries the mixed pulp and solution under the first set of press-rolls *z*, where the first rubber belt *e'* presses the solution through the filter-cloth. This solution, which is strong, is received in the first receptacle *f'* and is carried by the pipe *g'* to one of the decanting-tanks of the vat B. As it leaves the first set of press-rolls most of the pulp adheres to the first belt *e'*. It is, however, washed down to the cloth by the spray of water from the adjacent pipe *h'*, which also dilutes the values left as moisture in the pulp. The mixed pulp and water then pass under the second set of press-rolls *z*, where the second belt *e'* passes the solution, which is of medium strength, through the filter-cloth. This solution is received in the second receptacle *f'* and conducted by the pipe *g'* thereof to a tank of the vat B, separate from that in which the first solution is placed. In leaving the second set of press-rolls the pulp is watered by the pipes *h'* adjacent to the second belt *e'*, and the pulp and water are carried below the third set of press-rolls. Here the weak solution produced by the mixture of pulp and water is pressed through the cloth *s* and received in the third receptacle *f'*, from whence it is conducted by the pipe *g'*, complementary to said receptacle, to a separate tank of the vat B. After leaving the third set of press-rolls the pulp is forced from the cloth by the water discharged by the pipes *i'* and the beater *j'* and is discharged as tailings from the filter through a launder $a^2$, which may extend to a dump or any other point. After being acted on by the beater *j'* the cloth *s* passes between the squeeze-rolls *p' q'*, which serve to press the water from the cloth, with the result that the same returns to the receiving end of the filter in a clean and dry state. By turning the disks *l'*, and thereby raising or lowering the roller *k'*, the filter-cloth is carried toward or from the beater *j'* to increase or diminish the action of the beater on the cloth.

It will be readily appreciated from the foregoing that the construction of our improved filter is such that the slimes are effectually prevented from collecting and packing down on the filter-cloth and preventing the passage of the solutions therethrough; also, that by virtue of the chains traveling in ways or grooves in the frame and being connected to the filter-cloth the filter-cloth is spread out and always held in proper position with respect to the press-rolls and belts $e'$, which conduces to the thorough separation of the solution from the pulp.

We prefer in practice to use a pump $M^7$, Fig. 6, and conduits $M^9$ to return the slimes discharged from the tanks $a^4$ of vat B to either the tank A, as shown, or to the filter, as desired, this in order to pass the slimes through the filter the second time and recover the solution contained therein.

We have entered into a detailed description of the construction and relative arrangement of the parts embraced in the present and preferred embodiment of our invention in order to impart a full, clear, and exact understanding of the same. We do not desire, however, to be understood as confining ourselves to such specific construction and relative arrangement of parts, as such changes or modifications may be made in practice as fairly fall within the scope of our invention as claimed.

Having described our invention, what we claim, and desire to secure by Letters Patent, is—

1. A filter comprising a frame having parallel ways at its upper side, belts having their upper stretches disposed in said ways, means for driving the belts, an endless filter-cloth interposed between and connected with the belts, and means for pressing pulp against the upper stretch of the filter-cloth.

2. A filter comprising a frame having parallel ways at its upper side, belts having their upper stretches disposed in said ways, means for driving the belts, an endless filter-cloth interposed between and connected with the belts, endless strips of rubber or other suitable material connected to the inner side of the filter-cloth at the edges thereof so that their upper stretches will bear on the frame, and means for pressing pulp against the upper stretch of the filter-cloth.

3. A filter comprising a frame, having parallel ways at its upper side, belts having their upper stretches disposed in said ways, means for driving the belts, an endless filter-cloth interposed between and connected with the belts, rolls mounted in the frame and disposed below the upper stretches of the belts and filter-cloth, idlers for holding the upper stretches of the belts down in engagement with the rolls, rolls arranged above and adjacent to the upper stretch of the filter-cloth, an upper roll, a belt passed around said rolls above and adjacent to the filter-cloth and the upper roll, and means for supplying water to said belt.

4. A filter comprising a frame, an endless filter-cloth supported and adapted to be driven in the frame, means for forcing solution through the upper stretch of the filter-cloth, means for washing the lower stretch of the filter-cloth, means for beating the same, and means for squeezing moisture from said stretch of the cloth.

5. A filter comprising a frame, an endless filter-cloth supported and adapted to be driven in the frame, rolls arranged above and adjacent to the upper stretch of the filter-cloth, an upper roll, a belt passed around said rolls above and adjacent to the filter-cloth and the upper roll, means for supplying water to said belt, means for washing the lower stretch of the filter-cloth, means for beating the same, and means for squeezing moisture from said stretch of the cloth.

6. A filter comprising a frame having parallel ways at its upper side, sprocket-wheels mounted at the ends of the frame, and in alinement with the ways, sprocket-belts passed around said wheels, and having their upper stretches disposed in the ways, an endless filter-cloth interposed between and connected with the sprocket-belts, rolls arranged below the upper stretch of the filter-cloth, and geared with the upper stretches of the sprocket-belts, rolls arranged above and adjacent to the upper stretch of the filter-cloth, an upper roll, a belt of rubber or other suitable material passed around said rolls above and adjacent to the filter-cloth, and the upper roll, and means for supplying water to said rubber belt.

7. A filter comprising a frame having parallel ways at its upper side, sprocket-wheels mounted at the ends of the frame, and in alinement with the ways, sprocket-belts passed around said wheels, and having their upper stretches disposed in the ways, an endless filter-cloth interposed between and connected with the sprocket-belts, sets of rolls arranged below the upper stretch of the filter-cloth, and geared with the upper stretches of the sprocket-belts, sets of rolls arranged above and adjacent to the upper stretch of the filter-cloth, upper rolls complementary to the rolls above and adjacent to the upper stretch of the cloth, belts of rubber or other suitable material passed around the rolls above and adjacent to the upper stretch of the cloth, and the upper rolls complementary thereto, means for supplying water to said rubber belts, and separate receptacles arranged below the sets of rolls.

8. In an apparatus for extracting precious metals from their ores, the combination of a filter comprising a frame, an endless filter-cloth, means for driving same, means for pressing pulp against the upper stretch of the cloth at different points, and separate receptacles arranged below the cloth at such points, and a decanting-vat having separate tanks connected with the said separate receptacles of the filter; the said separate tanks communicating with the vat at their upper ends, and having valved discharges at their lower ends.

9. In an apparatus for extracting precious metals from their ores, the combination of a filter comprising a frame, an endless filter-cloth, means for driving the same, means for pressing pulp against the upper stretch of the cloth at different points, and separate receptacles arranged below the cloth at such points, and separate decanting-tanks connected with the said separate receptacles of the filter.

10. An apparatus for extracting precious metals from their ores comprising a filter, a decanting-tank arranged to receive solution from the filter, and means for returning the slimes from the tank to the filter for the purpose of recovering the solution contained in the slimes.

In testimony whereof we have hereunto set our hands in presence of two subscribing witnesses.

JOHN STOVEKEN.
LEO STOVEKEN.

Witnesses:
JOSEPH STOVEKEN,
ELLA FRANCES LUTES.